US008528021B2

(12) United States Patent
Kuang

(10) Patent No.: US 8,528,021 B2
(45) Date of Patent: Sep. 3, 2013

(54) INTERACTIVE MEDIA SYSTEM

(76) Inventor: Shaobo Kuang, Lansdale, PA (US)

( * ) Notice: Subject to any disclaimer, the term of this patent is extended or adjusted under 35 U.S.C. 154(b) by 387 days.

(21) Appl. No.: 12/661,280

(22) Filed: Mar. 15, 2010

(65) Prior Publication Data

US 2010/0175102 A1 Jul. 8, 2010

Related U.S. Application Data

(62) Division of application No. 10/753,227, filed on Jan. 8, 2004, now Pat. No. 7,716,715.

(60) Provisional application No. 60/438,817, filed on Jan. 10, 2003.

(51) Int. Cl.
*G06F 3/00* (2006.01)
*G06F 13/00* (2006.01)
*H04N 5/445* (2011.01)

(52) U.S. Cl.
USPC .................. 725/51; 725/40; 725/43; 725/48; 725/141; 700/65

(58) Field of Classification Search
None
See application file for complete search history.

(56) References Cited

U.S. PATENT DOCUMENTS 6,018,372 A 1/2000 Etheredge
2002/0035404 A1 * 3/2002 Ficco et al. .................... 700/65
2002/0097872 A1 * 7/2002 Maliszewski ................ 380/217
2002/0162121 A1 * 10/2002 Mitchell ...................... 725/135
2002/0195495 A1 * 12/2002 Melick et al. ............ 235/462.01
2003/0056225 A1 * 3/2003 Bione .......................... 725/116
2003/0126597 A1 * 7/2003 Darby et al. .................... 725/32
2003/0188313 A1 * 10/2003 Ellis et al. ...................... 725/60
2003/0191650 A1 * 10/2003 Turner et al. ...................... 705/1

* cited by examiner

*Primary Examiner* — Joshua Taylor

(57) ABSTRACT

An interactive media system includes a broadcasting device for broadcasting TV signals, and a receiving device for receiving TV signals. The TV signals, such as a TV commercial for new movie preview, contain screen related action codes that include device type, action type and the detail action information. The receiving device includes storage for storing the reference address for other home electronic devices, and a button on a remote controller for the users to start interactive with the interactive media system. When the user presses the button, the receiving device will send the action codes to the designated other home device or another TV screen channel, to allow users to perform the action on the other home device instead of performing the action on TV. The system also allows users just use number keys to navigate web.

18 Claims, 10 Drawing Sheets

Action Codes Examples:

| Device Type | Action Type | Start Time | End Time | Details | Submit |
|---|---|---|---|---|---|
| VCR | Record | 7:30 pm | 9:30 pm | CHN 41 | No |
| PC | www.order.com | | | 76ers game ticket | Yes |
| Digital TV | Down Load | | | 76ers previous game | Yes |
| Phone | Call | | | 1800-8888 | No |
| Cellular Phone | Send Message | | | talk@hotmail.com | Yes |

Fig. 4

Address Table:

| Device Name | Device Type | Address |
|---|---|---|
| My VCR | VCR | 10.1.1.10 |
| My DVD | DVD Player | 10.1.1.11 |
| My PC1 | PC | 10.1.1.20 |
| My PC 2 | PC | 10.1.1.21 |
| My phone | Phone | 10.1.1.30 |
| My Cellular Phone | Cellular Phone | 10.1.1.40 |
| My XBOX | Game Console | 10.1.1.50 |
| MY TV | TV Display Terminal | 10.1.1.60 |

Fig. 5

Prior Art

Regional
Countries, Regions, US States...

Society & Culture
People, Environment, Religion...

Education
College and University, K-12...

Arts & Humanities
Photography, History, Literature...

Science
Animals, Astronomy, Engineering...

Social Science
Languages, Archaeology, Psychology...

Reference
Phone Numbers, Dictionaries, Quotations...

Business & Economy
B2B, Finance, Shopping, Jobs...

Computers & Internet
Internet, WWW, Software, Games...

News & Media
Newspapers, TV, Radio...

Entertainment
Movies, Humor, Music...

Recreation & Sports
Sports, Travel, Autos, Outdoors...

Health
Diseases, Drugs, Fitness...

Government
Elections, Military, Law, Taxes...

Fig. 7

| Number | Command | Position |
|---|---|---|
| 1 | | |
| 2 | <a href=http://ww.yahoo.com/r/re> | Row 2, col 5 |
| 3 | <a href=http://ww.yahoo.com/r/bu> | Row 3, col 8 |
| 4 | <a href=http://ww.yahoo.com/r/cu> | |
| 5 | <a href=http://ww.yahoo.com/r/ci> | |
| 6 | <a href=http://ww.yahoo.com/r/ed> | |
| 7 | <a href=http://ww.yahoo.com/r/nm> | |
| 8 | <a href=http://ww.yahoo.com/r/ar> | |
| 9 | <a href=http://ww.yahoo.com/r/rs> | |
| 10 | <a href=http://ww.yahoo.com/r/en> | |

Fig. 9

INTERACTIVE MEDIA SYSTEM

This is a divisional application of the patent application Ser. No. 10/753,227, which was filed on Jan. 8, 2004 now U.S. Pat. No. 7,716,715.

The present invention is based on the provisional Patent Application Ser. No. 60/438,817, filed on Jan. 10, 2003, titled "Interactive media system".

FIELD OF THE INVENTION

The present invention relates to the field of interactive media systems, particularly to the interactive media systems, such as TV, VCR, computers, Internet web publish, video, movies, cell phones or game console.

BACKGROUND OF THE INVENTION

With the development of technology, especially Internet and digital TV, interactive media has become increasingly popular. Right now, the most widely used interactive media are the web pages or web browsers. In the web pages, there are many hyperlinks embedded. When the users click on the hyperlinks, it may go or submit to the other web pages. By using these embedded hyperlinks, the contents in web pages are interactive, and become more valuable to the users. In order to bring the successful story of Internet to TV, video or movies, many new technologies have been developed to put some things like hyperlinks in the TV programs or movies, allowing the users to interact with the content publishers. Here TV is digital TV. For example, on the TV, there is a toy advertisement. When the users use the mouse or the like to click on the hyperlinks, it brings the users to the buy or detail information page.

However, putting hyperlinks into the contents in TV, video, or game programs usually need broadcasting protocols or standard change. It costs a lot. In addition, the two-way connection is required for the receiving terminal or device. However, most users are just using one-way connection to receive the TV signals, such as regular public TV or Satellite TV. For the existing TV, especially analog TV broadcasting systems, hyperlinks cannot be added into its contents.

When people use PCs or Laptop computers to look for or view information through the Internet, they often use the mouse to click on or scroll the browser. However, when people use TV to view the information from Internet, they need something different than a mouse. Therefore, the so-called smart device has been invented, which is a small computer display device. One of the disadvantage of this kind of smart device is it will add a lot of cost to TV and the like. Another disadvantage of this kind of smart device is it cannot be in a very small size, like regular remote control.

At home, TVs are not the only electronic devices. We may have desktop or laptop computers, PDAs, cellular/regular phones, game consoles, VCRs, DVD players, mp3 players, and singing or karaoke machines. The current interactive media systems are only allow you to interact with the same devices.

When people use TVs to browse on Internet, they have to use a mouse-like device to move the cursor on the big TV screen. However, moving a small cursor on a big screen is not convenient for many people, especially older people. People have watched TV for years by just pressing buttons on a small remote control, and many of them still prefer pressing keys or buttons to browse on Internet on a small remote control or the like. When comparing the regular TV remote control, the so-called smart device is not small enough for the most people.

SUMMARY OF THE INVENTION

It is therefore the objects of the present invention are intended to overcome the drawbacks of the conventional art.

Accordingly, an object of this invention is to provide a new and improved interactive media system, which allows the user to interact through any of the devices, including the devices which are not the device receiving the broadcasting signals.

Another object of the present invention is to provide a new and improved interactive media system, which does not require the current broadcasting protocols or standards to be changed.

Another object of the present invention is to provide an interactive media system, which is even suitable for the current analog broadcasting system.

Another object of the present invention is to provide an interactive media system, which is more suitable for people interacting with media broadcasting system.

Another object of the present invention is to provide an interactive system, which is suitable for people interacting with the media broadcasting system by using small remote control unit.

Another object of the present invention is to provide an interactive media system, which is more suitable for people interacting with media broadcasting system by just pressing number keys on a small remote control unit.

Another object of the present invention is to provide an interactive media system, which is more suitable for people browsing through the Internet by just pressing keys or buttons on a small remote control unit.

Another object of the present invention is to provide an interactive media system, which allows people to browse on Internet through big TV screen by just pressing keys or buttons, and without requiring any changes on the current Internet system.

Another object of the present invention is to provide an interactive media system, which allows people to browse on Internet through big TV screen by just pressing keys or buttons, and without requiring any change on the process of publishing web pages.

In accordance with the present invention, an interactive media system includes

A broadcasting or sending device for broadcasting or sending content signals;

A receiving device for receiving the said content signals;

Wherein, the content signals include the screen related action codes which include device type, action type and the detail action information; and the receiving device includes means for storing the reference address for other home electronic devices, and a trigger means for the users to start interacting with the interactive media system; and the receiving device are wired or wireless connected to those other home electronic devices; when the user clicks or presses the trigger means, the receiving device will read the action codes coming with the screen contents, and based on the device type and the reference address from the reference address means, send the action type and the action detail information to the designated home electronic device, and perform the action on the designated home electronic device.

In accordance with the present invention, the said action codes may be the part of the contents so that existing broadcasting protocols or standards need no change; the receiving device further includes a contents scanning unit for scanning out the action codes from the contents.

In accordance with the present invention, the said action codes may be represented by serial graphic patterns, which can be scanned and translated by the said scanning unit.

In accordance with the present invention, the said receiving device may further include a memory unit for storing the information of any action type command in the screen, and the other command-related information such as the sequence or order, the position of the command.

In accordance with the present invention, the said receiving device may further include a controller unit, by which users control the receiving device.

In accordance with the present invention, an interactive media system includes

A device for receiving data from or sending data to a host center through a wired or wireless connection, or Internet;

Wherein the said device includes

Process Unit for processing data and generating the data for displaying;

Storage or memory means storing the data for displaying;

Displaying unit for displaying based on the data in the said memory means;

Said device further includes a storage or memory means for storing the commands that are obtained from the said received data;

Said process unit will automatically assign a number or letter to each the said command and store the assigned related numbers or letters into the commands storage or memory means, Said displaying unit will display the said assigned numbers or letters next to, overlapping, or above the symbols, such as images or texts, representing the commands, on screen;

When a user presses a key on the remote control, the process unit will find the particular command based on the user pressed key number or letter, and execute the command.

The present invention is described in the detail below, together with its further objectives, features, and advantages, in conjunction with the following drawings:

BRIEF DESCRIPTION OF THE DRAWINGS

FIG. 4 shows some examples of the action codes in accordance with the present invention.

FIG. 5 shows some examples of the data in the address unit in accordance with the present invention.

FIG. 7 shows an example screen in prior art.

FIG. 9 shows an example table storing the related commands for the keystroke in FIG. 8.

DETAILED DESCRIPTION OF THE INVENTION

Figure 1:
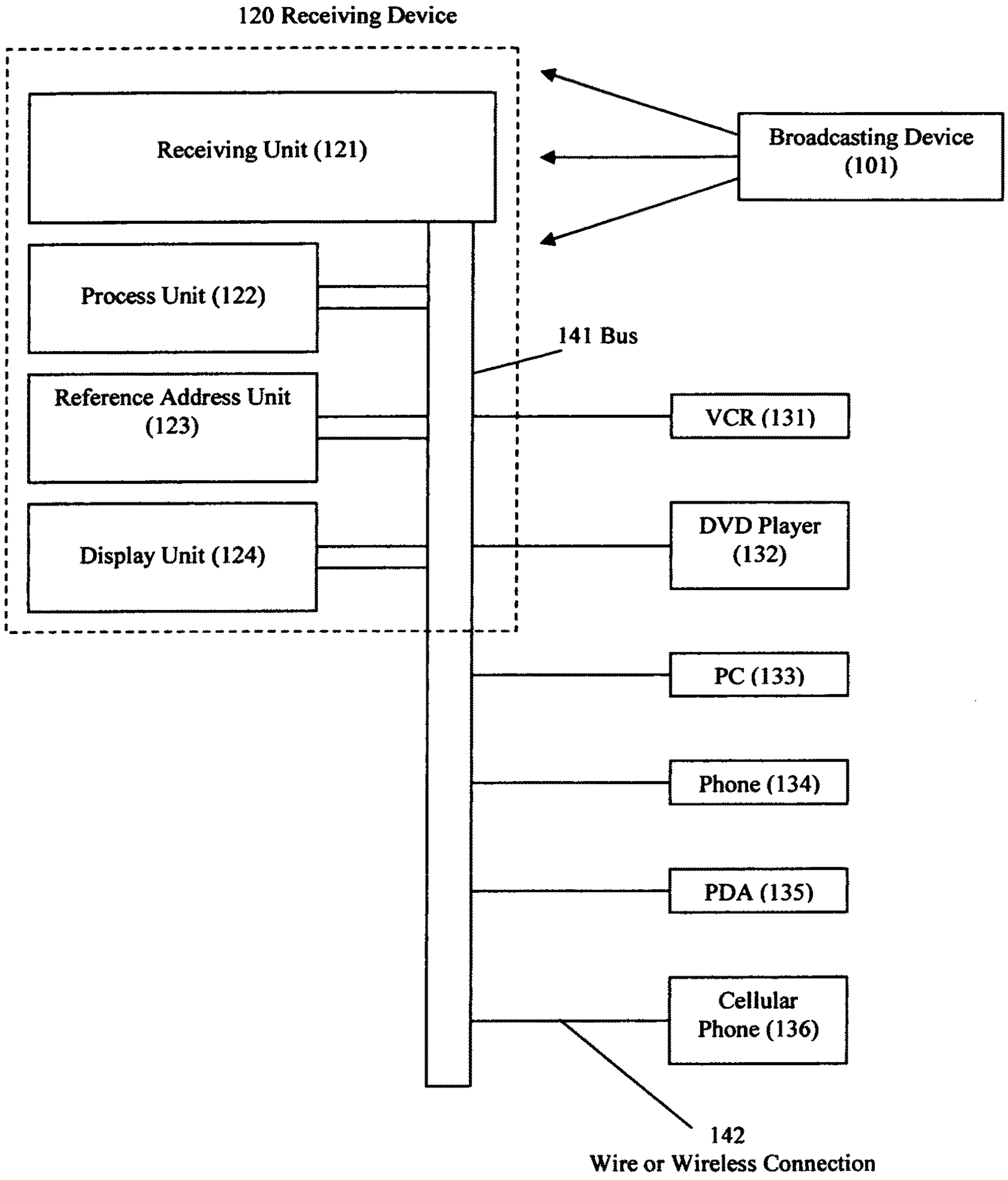
FIG. 1 is a schematic drawing showing an interactive media system in accordance with the present invention.

Referring now to the drawings, FIG. 1 shows an interactive media system, which includes a one-way broadcasting device 101 and receiving device 120. Receiving device includes receiving unit 121, process unit 122, reference address unit 123, and display unit 124. Data and address bus 141 connects to Receiving device 121, process unit 122, reference address unit 123, and display unit 124 together. VCR 131, DVD player 132, PC 133 Phone 134 PDA 135 Cellular phone 136, etc., are wired or wireless connected to the receiving device 101 by wire or air 142.

The interactive media broadcasting system shown in FIG. 1, broadcasting device 101, which may be either TV stations or cable TV carriers, broadcasts the contents. Receiving device includes receiving unit 121, process unit 122, reference address unit 123, and display unit 124. Receiving device may be TV or TV set top box, and receives the contents signals. When the user sees a good preview TV program on TV (display unit 124), for example NBA basketball game, he or she presses or clicks the trigger key to interact with TV. Here, the trigger key may be a button on the remote controller or remote keyboard. Process unit 122 processes the received signals and filters out the action codes from the content signals. The action codes include device type, action type, and other detail action information such as start time and ending time. Process unit 122 looks for the address from address unit 123 of the device, which matches the device in action codes, and sends the action codes to the device. For example, the received action codes are as follows: action device is VCR, action type is record, start time 7:30 pm, ending time 9:30 pm, and the detail information is channel ESPN. Confirmed by the user, the process unit 122 will send the received action codes to VCR 131, and set recording time and channel based in action codes information. In another example, the action codes information is that device type is PC, action type is www.order.com, and action detail is 76ers's ticket. Confirmed by the user, the browser will automatically open with URL=www.order.com?type=76ersticket.

In the above mentioned interactive media system, the action codes can be broadcasted with the content signals. For example, action codes can be put in the spare space in the transmission stream, or intervals between the frames or screens. The media carrier for broadcasting media and the manufacturers for making the receiving device should agree on the protocols for the interactive broadcasting. In FIG. 1, 101 is a one-way broadcasting device. Of course, it can also be a two-way system.

The following is an example for action codes:

<PRNPRT (detail information)>

Figure 2A:
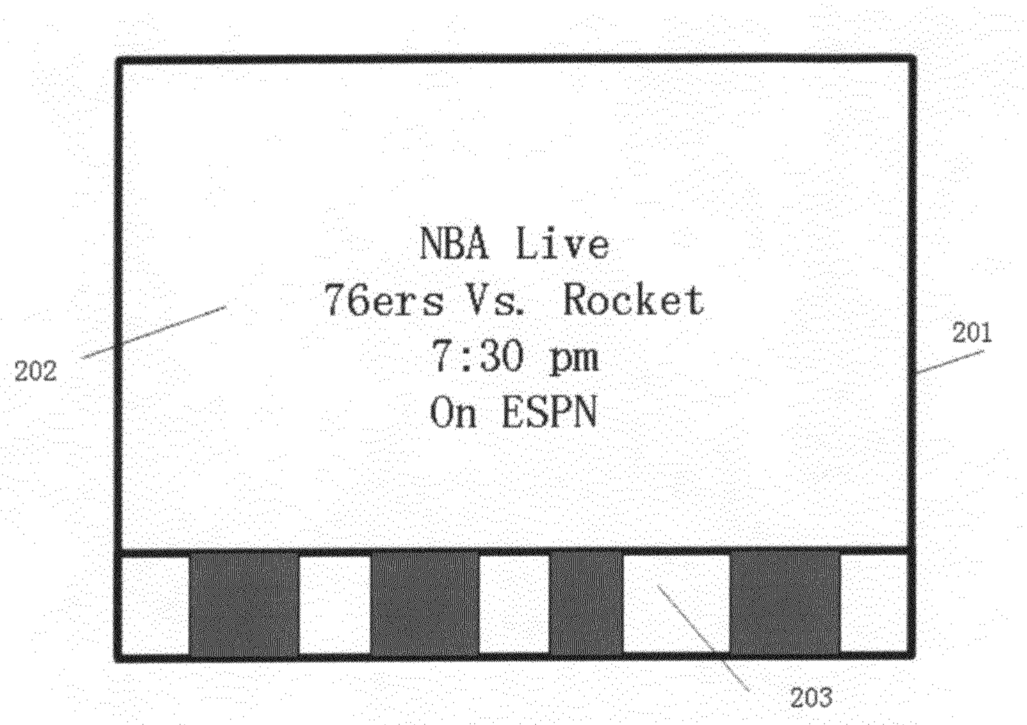
FIG. 2A is a schematic illustration of the action codes coming with the TV contents in accordance with the present invention.

The first 3 letters are the device code. PRN is printer. The second 3 letters are the action type. PRT is printing. This action codes tell the TV to send the contents to the printer. The detail information may be a cooking recipe. It of course, the action codes also can send the recipe to an electronic cooking machine. That means, when a user watches a cooking program on TV, he or she can get the recipe to print or to download it to the cooking machine just by pressing one button, FIG. 2A shows another example in accordance with the present invention. 201 is TV screen showing a TV preview for a live NBA basketball game. 203 is a part of the screen, and it is something like graphic bar codes. In this example, the interactive media system further includes a scanning unit (FIG. 3, 325). The scan unit is able to read the action codes information from the bar code like graphics at the bottom of the screen in FIG. 2.

Figure 2B:
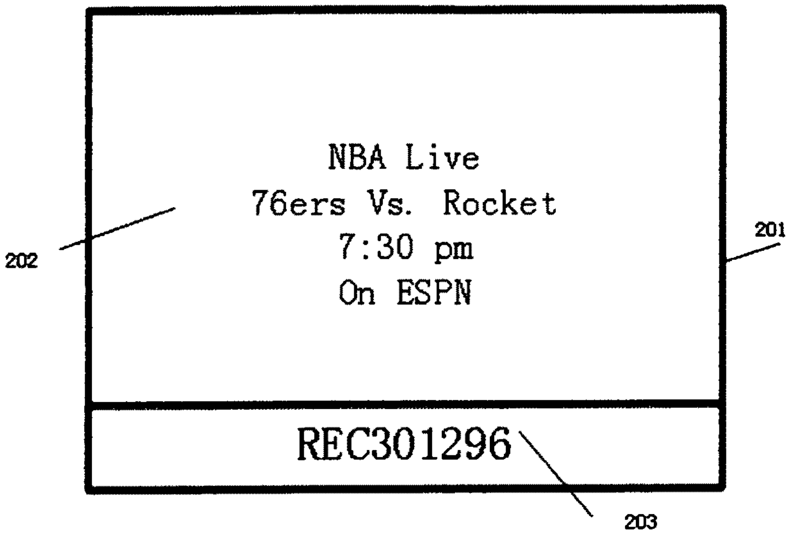
FIG. 2B is another schematic illustration of the action codes coming with the TV contents in accordance with the present invention.
Figure 3:
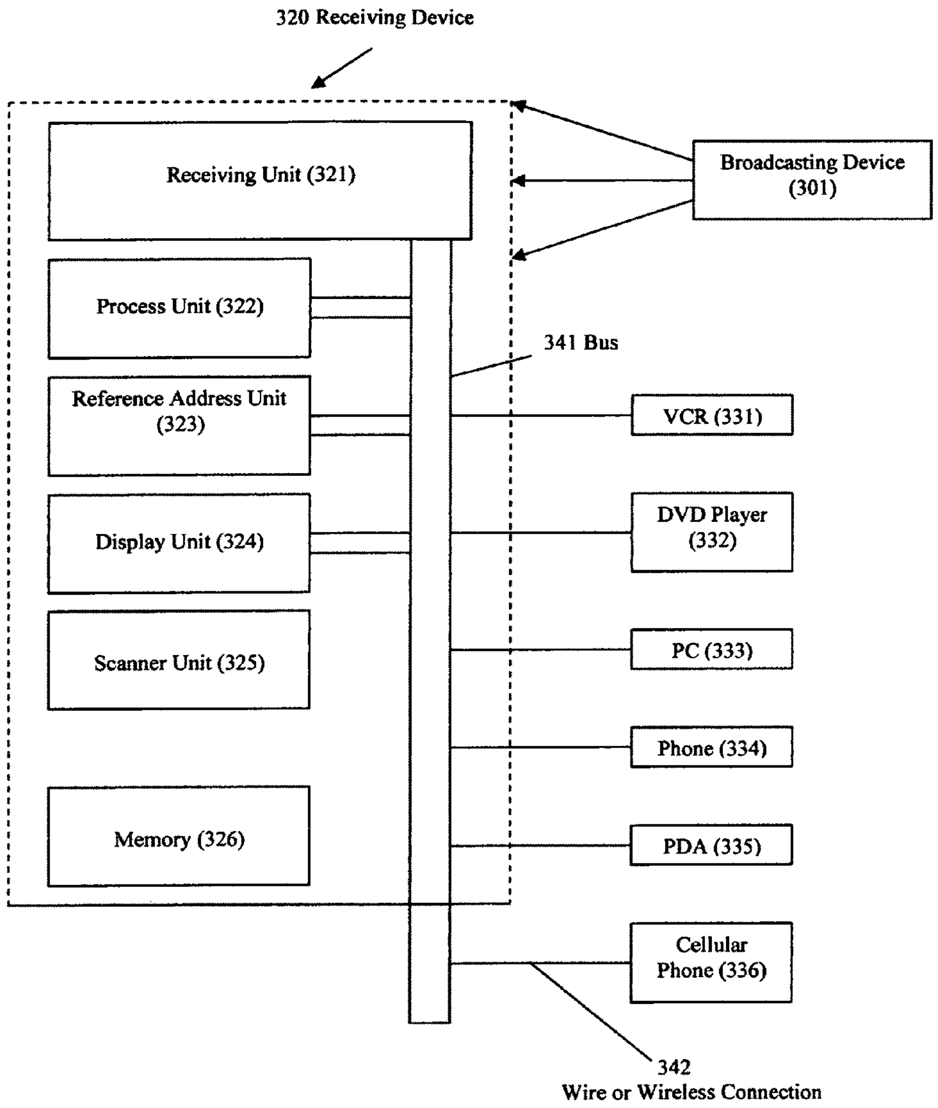
FIG. 3 is a schematic drawing showing an interactive media system in accordance with the present invention.

FIG. 2B shows another example in accordance with the present invention. 201 is the TV screen showing a TV preview for a live NBA basketball game. 203 is part of the screen, and it is the combination of the code and the numbers. In this example, the interactive media system further includes a scanning unit (FIG. 3, 325). The scan unit is able to read the action codes information by scanning the code and the numbers at the bottom of the screen in FIG. 2B.

Figure 2C:
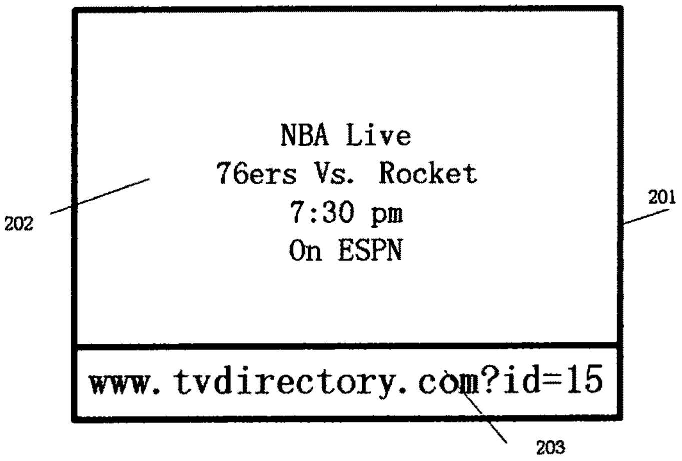
FIG. 2C is another schematic illustration of the action codes coming with the TV contents in accordance with the present invention.

FIG. 2C shows another example in accordance with the present invention. 201 is the TV screen showing a TV preview for a live NBA basketball game. 203 is part of the screen, and it is something like the URL. In this example, the interactive media system further includes a scanning unit (FIG. 3, 325). The scan unit is able to read the URL at the bottom of the screen in FIG. 2C.

In FIGS. 2A, 2B and 2C, the digital bar codes are easy to be scanned and it allows larger errors in the transmission. The codes and numbers are easy to be understood. URL can directly lead the user to the related web page, and make further processes that are more complicated.

Although, in the examples shown in FIGS. 2A, 2B and 2C, for illustration reasons, the digital bar codes or the command codes are visible to people, they may not be visible to people, in practice, as long as they can be recognized or read by the scanning unit in the interactive media system of the present invention.

FIG. 3 shows an interactive media system, which includes a one-way broadcasting device 301 and receiving device 320. Receiving device 320 includes receiving unit 321, process unit 322, reference address unit 323, display unit 324, scanner unit 325, and memory 326. Data and address bus 341 connects Receiving device 321, process unit 322, reference address unit 323, and display unit 324 together. VCR 331, DVD player 332, PC 333 Phone 334 PDA 335 Cellular phone 336, etc., are connected to the receiving device 101 by wire or air 342. In this example, broadcasting device 301 broadcasts the content by using the existing protocol without any change. Memory 326 is used for storing the current action codes, which relate to the current screen. Memory 326 may be cleaned every five seconds or may be rewritten every time the new screen scans. When user presses or click the trigger key or button, scanner unit 325 will scan the bottom part of the screen and read the action codes information. It will store the action codes information into memory 326. Process unit 322 will look for the address from address unit 323 and send the action codes to the designated device. For example, TV advertisement asks for email or instant message response. The action codes will be sent to cellular phone with the AOL ICQ address. The user can then send the message to the TV advertiser.

FIG. 4 shows some typical action code(s) examples. For example, in the action code for VCR recording, device type is VCR, action type is RECORD, start time is 7:30 pm, ending time is 9:30 pm detail information is CHN 41. Some other information may be included, such as action date. In the TV program download action code, device type is TV, action code is downloaded and detail is the 76ers' previous game.

FIG. 5 shows an example in the reference address unit. The information includes, in the table, device name, device type, address, etc.

In FIG. 1 and FIG. 3, the broadcasting device is a one-way broadcasting device. However, it may have some channels in two-way broadcasting, such as two-way cable connection. When receiving the content from one-way broadcasting, the user can press the trigger button to switch to two-way connection, and then interact with the content provider on TV.

Figure 6:
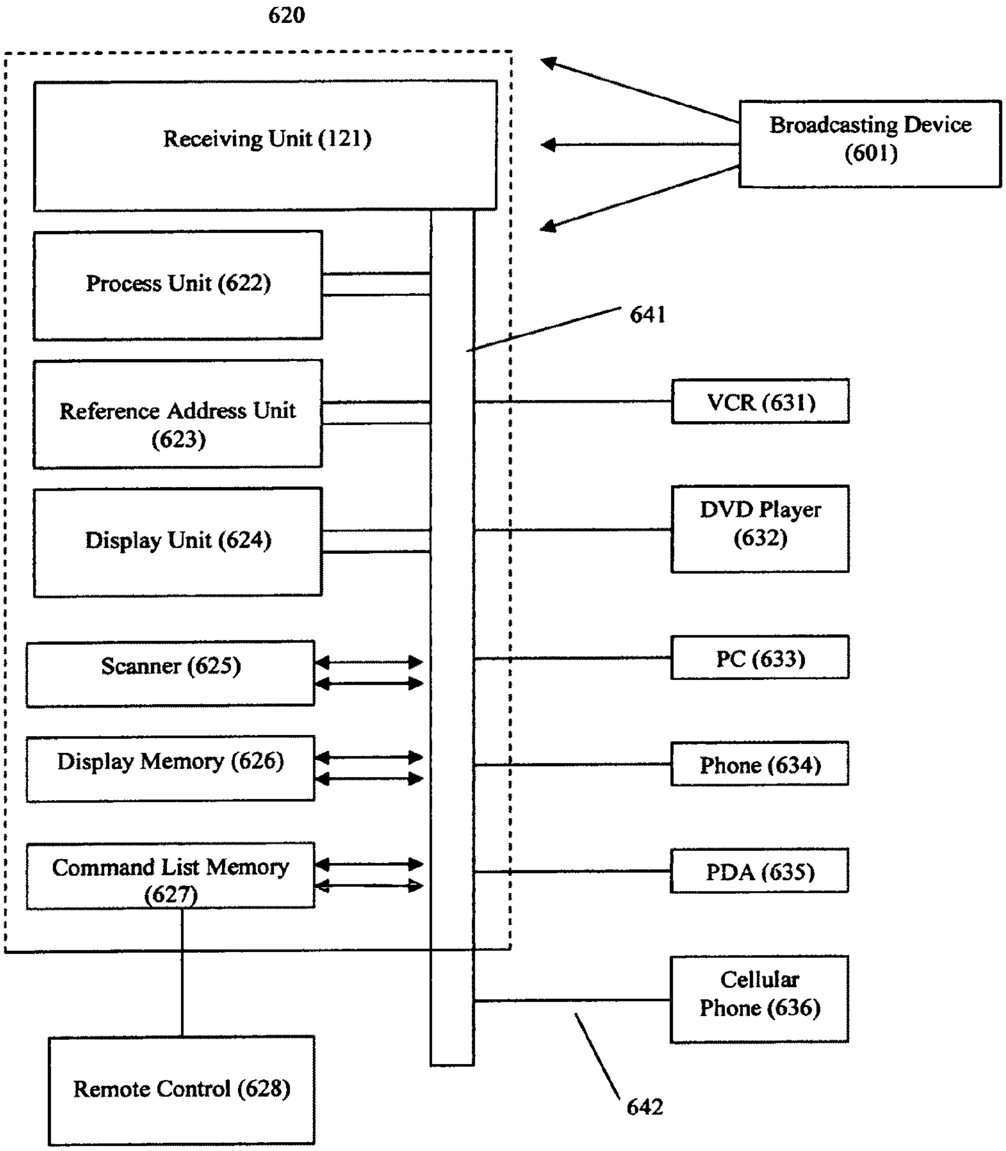
FIG. 6 is a schematic illustration of an interactive digital TV system in accordance with the present invention.

FIG. 6 shows an interactive media system, which includes content source 601 and receiving device 620. Content source 601 is usually any web site, such as yahoo.com. Receiving device 620, here, may be a digital TV system, PC, or the like. Through Internet connection, receiving device 620 connects to content source 601. Receiving device 620 includes receiving unit 621, process unit 622, reference address unit 623, display unit 624, scanner unit 625, displaying memory 626 and command list memory 627. Data and address bus 641 connect Receiving device 621, process unit 622, reference address unit 623, display unit 624, scanner unit 625, displaying memory 626 and command list memory 627 together. VCR 631, DVD player 632, PC 633 Phone 634, PDA 635, Cellular phone 636, etc., are connected to the receiving device 620 by wire or air 642. Display Memory 626 is used for storing the display information, which is similar to the memory in graphic card in a PC. Scanner unit 625 will scan the screen and read the action codes information, such as html tag information, and put the action code information and its screen position into position memory 627. When the user presses a switch key on the remote controller 628, process unit 622 will search in the command list memory (627), and find the positions and order numbers or letters. Then, the system will display the order numbers or letters at the position near to or next to or overlap or above the related tags or symbols (graphics or texts). The user will, based on the displayed numbers or letters, press the numbers or letters on the remote control. The system will then, based on the tag information, go to the next page. Therefore, the users are able to browse on Internet by just using a small number keypad, which is usually on the controller. On the remote control 628, there is a switch button allowing users to hide or display the order numbers or letters on the screen.

FIG. 7 shows a normal display of an Internet page (yahoo.com) on a display device, such as digital TV or a personal computer screen. On this screen, users need to use a mouse or the like to click on the desired link, and go to the next page. It is very convenient to use a mouse to browse on Internet in front of a computer screen, which is usually a small screen, and on the top of the user's desk. However, it is not easy to use a mouse to click on a TV screen, especially on a big TV, such as HDTV, home theater screen, or flat panel screen. For some people, especially for those older people, the mouse is not a user-friendly device. They would prefer to just press button on TV remote control.

Figure 8:
FIG. 8 shows an example screen in accordance with the present invention.

FIG. 8 shows example screen display in accordance with the present invention. On this screen, the numbers are automatically generated and displayed on the screen. In this example, the process unit (622), in FIG. 6, generates number 2 for "Regional" hyperlink, number 3 for "Business & Economy" hyperlink, and etc. The process unit (622) stores the assigned or generated numbers and the related commands, including the relationship, into the command list memory (627). When a user presses a key button, for example, the number 2 button, from the key controller (remote controller or keyboard), the process unit (622) will, based on the number 2, find the particular command for "Regional" link, and execute the command and bring the user to the "Regional" page.

FIG. 9 shows an example of the data stored in the command list memory. In left column, it shows numbers that are assigned or generated by the process unit (622). In the middle column, it shows the number related commands. In the right column, it shows the displaying position.

Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications and applications is defined in the following claims.

Therefore, the forgoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

The invention claimed is:

1. An interactive media system comprising:

a broadcasting or sending system for broadcasting or sending TV or video content signals, which include one or more action codes;

a TV set for receiving the TV or video content signals, which includes a TV displaying screen for displaying the received TV or video contents, and a remote controller for allowing users to remotely control said TV set operations;

one or more other home electronic devices, which are wired or wireless connected to said TV set;

wherein, said action code includes an action, an action type or an action device type, a Uniform Resource Locator (URL) for allowing to switch the current TV displaying screen, and other detail action information;

said remote controller further includes one or more function buttons or keys for sending a signal to said TV set and controlling to switch said TV displaying screen from the current displaying TV or video contents to said URL, and perform said action code on the current TV displaying screen;

a trigger key or button for allowing users to press on it and send a signal to said TV;

and said TV set further includes means for reading and storing the action codes and the related information from the received TV or video contents for the current displaying screen;

means for assigning each said home electronic device to one or more electronic device types;

means for assigning a reference address to each said electronic device;

address unit for storing said electronic devices or said reference addresses, said electronic device types, and the mapping relations between said electronic devices and said electronic device types;

means for obtaining the action codes, the action types or the action device types, and URLs from said action code reading and storing means in response to said signal send by user's pressing said trigger key or button;

means for looking up, in said address unit, and finding one or more home electronic devices or reference addresses whose device types match with said obtained action types or the action device types in response to said signal send by user's pressing said trigger key or button;

processing unit for, in response to the said signal send by users from said trigger button or key in said remote controller, controlling said obtaining means to obtain the action codes, the action types, or the action devices types, and URLs for the current display, controlling said matching means to find one or more home electronic devices whose device types match with said obtained action types or the action device types, controlling not to switch said TV screen to said URL, passing said URLs and the other action code information to the found matched other home electronic devices without performing said action codes in said TV set, allowing users to perform the action codes on said found other home electronic devices, and keeping the current display on said TV displaying screen un-interrupted.

2. The interactive media system according to claim 1, said broadcasting system is a one-way broadcasting system, wherein said TV or video contents, which are currently displayed in the display screen, are send to said TV set by air, satellite, or cable in a one-way mode.

3. The interactive media system according to claim 1, wherein the said action codes are the part of the displayed image contents so that existing broadcasting protocols or standards need no change; the receiving device further includes a contents scanning unit for scanning out the action codes from the contents.

4. The interactive media system according to claim 3, wherein said action codes are represented by a bar code, which can be scanned and translated by the said scanning unit.

5. The interactive media system according to claim 1;

wherein said receiving device is a TV set and said other home electronic device are desktop or laptop computers, PDAs, cellular phones, game consoles, VCRs, DVD players, cooking machine, and hard disk.

6. The interactive media system according to claim 1, wherein said received TV or video contents are TV program preview, and said type in said action codes is recording, said found matched device is VCR.

7. The interactive media system according to claim 1, where said received TV or video contents are commercial shows, and said action code in said contents includes a URL to an on-line order site.

8. The interactive media system according to claim 1, where said received TV or video contents are advertisements, and said action code in said contents includes one or many email addresses, phone numbers, instant message ID, or other contact addresses or ID so that users can interact with an advertiser through email, phone or instant message or other methods.

9. The interactive media system according to claim 5, wherein said other home electronic device is another channel with Internet connection in the receiving device.

10. The interactive media system according to claim 2, wherein said one-way broadcasting system is a regular public TV or Satellite TV system.

11. A method of interactive media processing comprising:

under control of a TV set, receiving broadcasted TV or video content signals, which include one or more action codes that include one or more actions, action types or an action device types, one or more Uniform Resource Locators (URLs), and other detail action information;

displaying said received TV or video contents on a display screen in said TV set;

under control of a control device, in response to only a single action being performed by a user, to send a signal to said TV set;

under control of said TV set, in response to said signal, triggered by said user's only single action, obtaining said action codes from said TV or video contents;

based on said action codes, looking for in a stored home electronic device table, which stores one or many electronic devices or their reference addresses, the types of the electronic device, and the mapping relations between said electronic devices and said electronic device types, and finding out one or more home electronic devices whose device types match with said obtained action types or action device type;

controlling to send or pass said URLs and the other action code information to said matched one or more home electronic devices without performing said action codes in said TV set, controlling not to switch the current TV or video display to said URLs.

12. A method of claim 11, wherein, said action code includes an action, one or more action types or action device types, one or more Uniform Resource Locators (URLs), and said controlling step keeps the current display on said TV displaying screen un-interrupted.

13. A method of claim 12, wherein, said control device is a remote controller of said TV set, and said only a single action being performed is that said user presses a trigger button or key on said remote controller.

14. A method of claim 13, wherein, said electronic device table storing said electronic devices or their reference addresses, electronic device types, and the mapping relations between said electronic devices and said electronic device types.

15. A method of claim 14, wherein, said looking up step includes looking up, in stored device table, and finding out one or more home electronic devices or reference addresses whose device types match with said obtained action types or the action device types in response to said signal triggered by said user's single action.

16. A method of claim 15, wherein, said home electronic device are TV sets, desktop or laptop computers, PDAs, cellular phones, game consoles, VCRs, DVD players, cooking machine, and hard disk.

17. A method of claim 16, wherein, said received TV or video contents are commercial shows, and said action code in said contents includes one or more URLs to one or more on-line order or shopping sites, or includes one or many email addresses, phone numbers, instant message ID, or other contact addresses or ID.

18. A method of claim 17, where, said TV or video contents, which are currently displayed in the display screen, are broadcasted to said TV set by air, satellite, or cable in a one-way mode.

* * * * *